United States Patent Office 3,442,181
Patented May 6, 1969

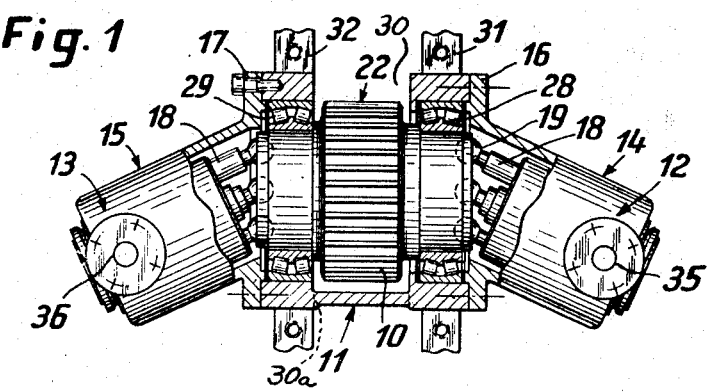
Fig. 1
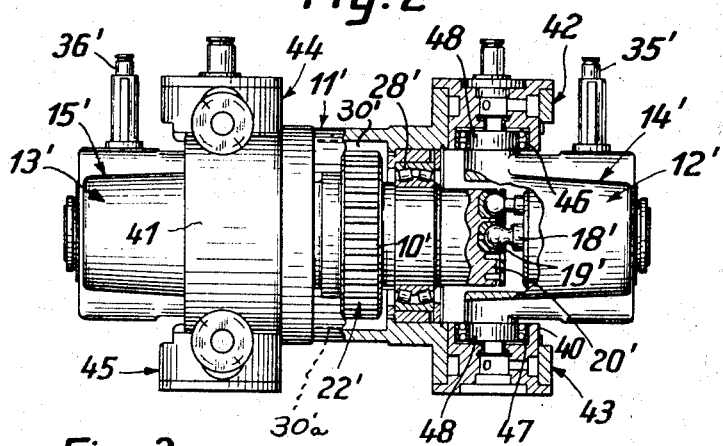
Fig. 2
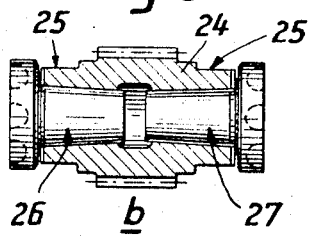
Fig. 3
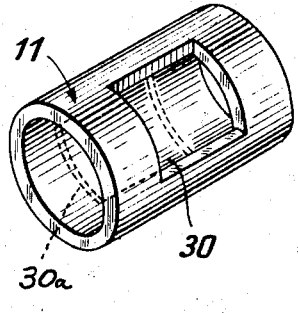
Fig. 4
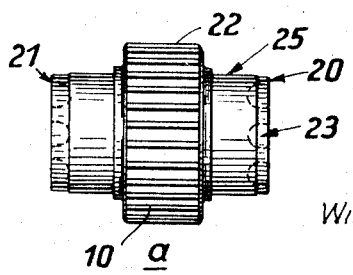
INVENTOR
WILHELMUS FRANCISCUS THEODORUS CAROLUS OLDERAAN
BY
ATTORNEYS May 6, 1969 W. F. T. C. OLDERAAN 3,442,181
HYDROSTATIC AXIAL PISTON TRANSMISSION ASSEMBLY
Filed Nov. 24, 1967
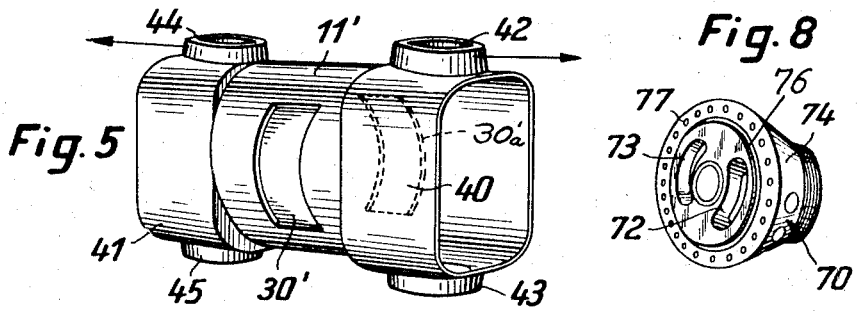
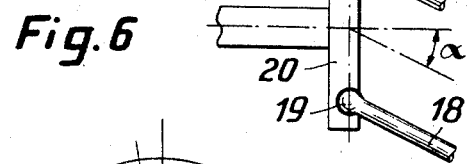
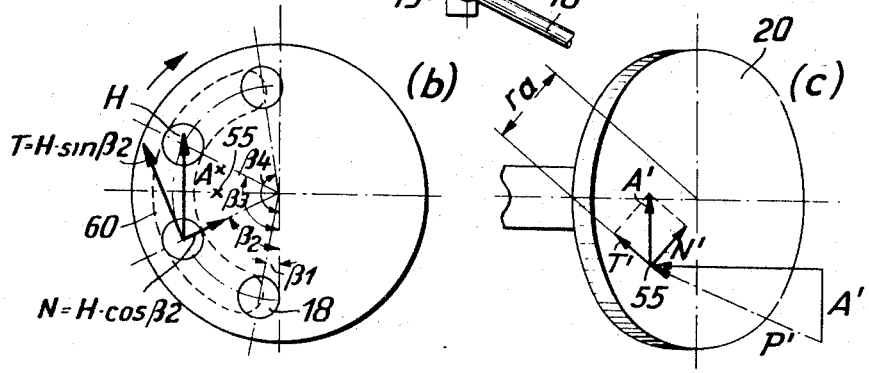
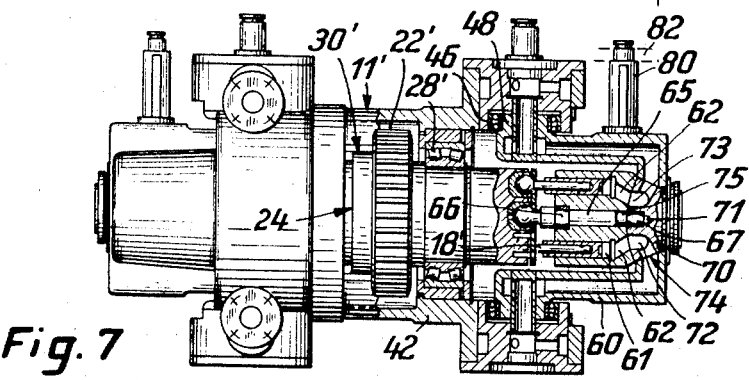
INVENTOR
WILHELMUS FRANCISCUS THEODORUS CAROLUS OLDERAAN
BY
Beaman & Beaman
ATTORNEYS

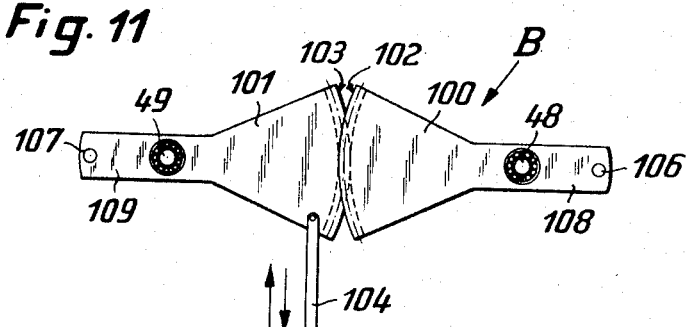
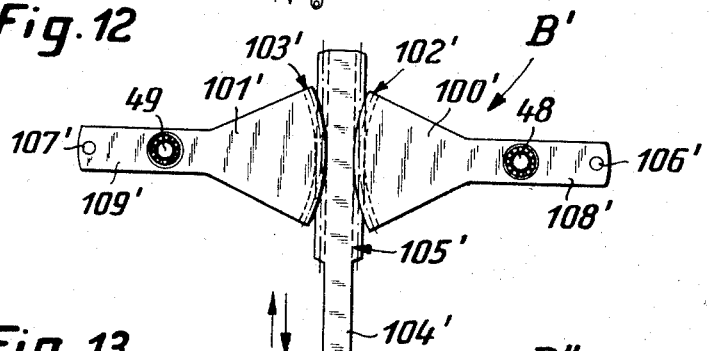
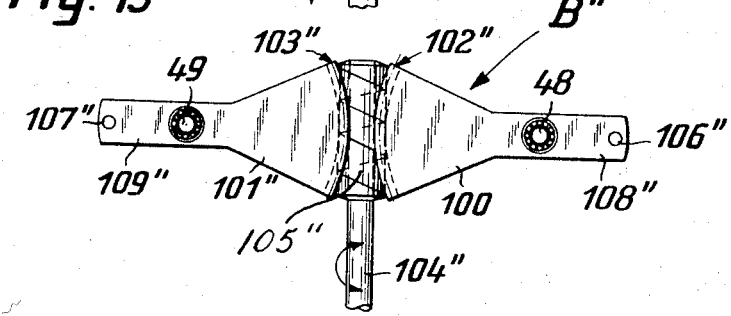
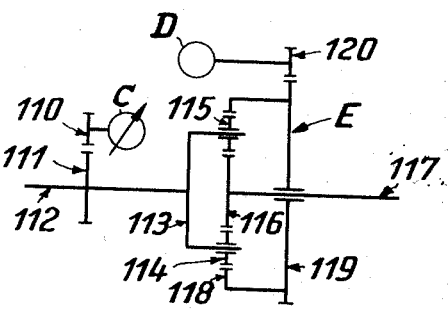

3,442,181
HYDROSTATIC AXIAL PISTON TRANSMISSION ASSEMBLY
Wilhelmus Franciscus Theodorus Carolus Olderaan, Gouda, Netherlands, assignor to Metaalbedrijf Rademakers N.V., Rotterdam, Netherlands
Continuation-in-part of application Ser. No. 514,934, Dec. 20, 1965, now abandoned. This application Nov. 24, 1967, Ser. No. 685,347
Claims priority, application Germany, Dec. 22, 1964, M 63,588
Int. Cl. F01b *13/04;* F16d *31/06;* F04b *1/02*
U.S. Cl. 92—57                                              6 Claims

ABSTRACT OF THE DISCLOSURE

A hydrostatic piston engine including a primary supporting cylindrical tubular casing upon which cylindrical blocks are mounted for equal angular relationship to the casing, and a drive shaft mounted therein. The cylindrical portion of the casing absorbing bending moments, and having a power output opening, or openings, defined therein at the location, or locations, of neutral bending moment within the cylindrical casing.

*Cross references to related applications*

This application is a continuation-in-part application of United States Ser. No. 514,934 entitled Hydrostatic Axial Piston Transmission Assembly, filed on Dec. 20, 1965, now abandoned.

*Background of the invention*

The invention pertains to hydrostatic transmission devices using linearly movable pistons which may function either as motors or pumps, the axis of rotation of the piston supporting element being angularly related to the axis of rotation of a drive member wherein interposing the pistons between the drive member and the piston support member produces linear movement of the pistons upon rotation of the drive member and the piston support member.

The general type of device to which the invention is directed is well known. A device of this type which is not adjustable is shown in United States Patent 2,875,701. An axial transmission having adjustable features to regulate the input or output is shown in United States Patent 2,956,407.

Prior art devices have the disadvantage of employing housings and supports for the drive shaft which are of such a construction as to not effectively resist the very high lateral pressures imposed upon the drive shaft casing. Thus, in the past, one of the disadvantages of apparatus of this type resulted from the short wear life of bearings due to deflections produced by the high operating pressures. In known axial piston transmission devices the bearings of the drive shaft are of only a limited size, which affects their ability to withstand the high lateral forces. In most instances, the housings and supports of prior art devices are formed of several components, often having a joining line at a critical location, and using bolts or other fasteners to produce the assembly. This type of arrangement has resulted in excessive bearing wear and short transmission life.

*Summary of the invention*

The purpose of the invention consists in the creation of a hydrostatic transmission wherein the factors which influence the life span thereof are substantially reduced, or removed. Basically, the invention is concerned with fully equalizing the axial forces of the transmission, particularly when two piston support devices are used in opposed relationship and simultaneously. Furthermore, the invention is concerned with absorbing the bending moments in the transmission which act upon the drive shaft, without the outer housing parts which enclose the transmission from being subjected to significant bending stresses. Additionally, the practice of the invention produces an arrangement which prevents dry running between the cylinder block at the control face due to the lubricating film being squeezed from this surface as a result of tilting, or angular adjustment.

According to the invention, a hydrostatic axial piston transmission assembly includes at both sides of a common driving shaft provided with driving flanges at its ends, axial piston units which act in contra-rotation on the said driving shaft, the driving shaft is engaged in a cylindrical supporting element of great bending strength which accommodates radial bearings for the shaft and which is mounted in the housing of the transmission. The cylindrical supporting element includes at least one window-like opening to provide access to the driving shaft gear and which is arranged substantially in the region thereof where the bending moment is neutralized, and an opening may be formed at each of the two locations of neutralized bending moment, if desired. The housings of the axial piston units may be secured to the ends of the cylindrical supporting element. Alternatively, the housings of the axial piston units may be mounted so that they can be swiveled by means of pivots engaging in eyes which may be provided in the region of the ends of the cylindrical supporting element. The radial bearings arranged in the supporting element are preferably in the form of self-aligning roller or ball bearings. The driving shaft may be in one piece with the driving flanges at its ends, for example it may be forged, or it may consist of a central part and two driving-flange bodies, which carry the driving flanges at their outer ends and which are preferably tapered, the driving-flange bodies being engaged in the central part and being secured to the latter, for example, by shrinking the latter on to them. According to the invention, the driving shaft should have great bending strength.

The control face of each axial piston unit may be formed by a convex smooth surface on the control cone of the unit and by a concave smooth surface on the cylinder body. An annular groove may be provided between the central portion of the smooth surface of the control cone and the outer periphery thereof, the central portion containing the kidney shaped ports of the control cone.

The hydrostatic axial piston transmission according to the invention may be equipped with swiveling axial piston units arranged on both sides of the driving shaft, the axial piston units being adapted to be swiveled in such a way about pivots located on the said units, within a predetermined swiveling range, by adjusting means, that they are in like angular positions with respect to the central axis of the driving shaft in any position of adjustment. The adjusting means may consist of a central control element displaceable with respect to the housing by means of guide rails and carrying further guide rails or guide bushings, and guide members receiving the pivots or swiveling pins in rotatable bearings, the guide members being guided by guide rails or guide bushings on the central control element in such manner as to be axially displaceable. Alternatively, the adjusting means may consist of a pair of adjusting members which are pivotally mounted on the pivots of the axial piston units and which are provided with toothed segments cooperating either directly with one another or with an intermediate member in the form of a rack or a worm engaged between the adjusting members. In the latter case the swiveling pins of the axial piston units are engaged in holes located in arms which are provided on the adjusting members, opposite the toothed segments thereof. Such rack or worm may be mounted as an adjusting rod.

Axial piston transmission assemblies according to the invention are especially suitable for driving connection to planetary gearng with automatic load equalization, the axial piston transmission assemblies being connected to two inputs of the planetary gearing and at least one of the axial piston transmission assemblies being equipped with adjustable axial piston units.

Brief description of the drawing

FIG. 1 illustrates, partly in section, a double hydraulic unit according to the invention in which the angular positions of the axial piston units with respect to the driving shaft are fixed, FIG. 2 shows, partly in section, a transmission unit similar to that of FIG. 1, but with axial piston units which are adapted to be swiveled relatively to the driving shaft, FIG. 3 shows the driving shaft of a device according to the invention, FIG. 4 shows a cylindrical supporting element for use in the embodiment according to FIG. 1, the alternative or other location of the gear access opening being shown in dotted lines, FIG. 5 shows a cylindrical supporting element for use in the embodiment according to FIG. 2, the alternative or other location of the gear access opening being shown in dotted lines, FIG. 6 is a diagrammatic representation showing the manner in which the pistons cooperate with the driving flanges and in which the piston force acting in the piston rods is converted into rotary force and showing also the position of the admission port in relation to the position of the pistons, FIG. 7 shows, partly in longitudinal section, one of the axial piston units of FIG. 2, FIG. 8 shows the control cone of the axial piston unit of FIG. 7, FIG. 11 shows another constructional form of the adjusting arrangement, FIGS. 12 and 13 show constructional forms similar to that of FIG. 11, and FIG. 14 is a diagrammatic representation of an overdrive comprising the combination of hydrostatic contrarotating axial piston transmissions according to the invention with planetary gearing.

Description of the preferred embodiments

Figure 9:
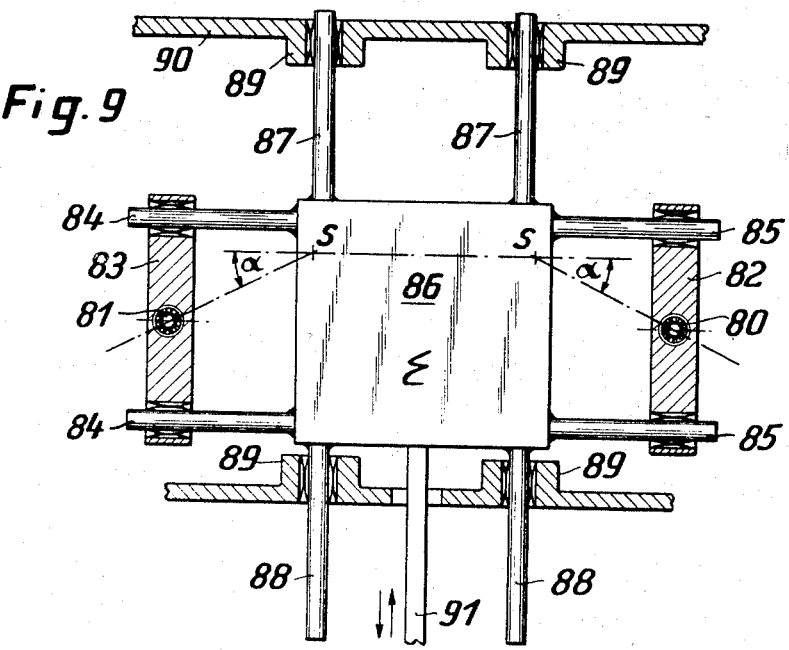
FIG. 9 illustrates, partly in section, one constructional form of the apparatus for swiveling, simultaneously but in opposite directions, the axial piston units of a double transmission such as the embodiment of FIG. 2 for example.

Referring to FIG. 1, the hydrostatic double axial piston unit shown therein comprises a driving shaft 10, a substantially cylindrical supporting body 11 enclosing the driving shaft and two axial piston units 12, 13, which are disposed opposite one another and arranged adjacent the end faces of the driving shaft. The axial piston units 12, 13 have their housing 14, 15 connected to the end faces of the cylindrical supporting body 11 by means of flanges 16, 17 and are bolted to the said supporting body at a fixed angle of, for example, 25°. The driving shaft 10, FIG. 3a, has at its end faces, driving flanges 20, 21 which are arranged symmetrically with respect to the toothed rim or ring gear 22, the said driving flanges being provided with counter-surfaces 23 to receve the spherical or convex heads 19 of the pistons 18 of the axial piston units 12, 13. Instead of the ring gear 22, it is also possible to provide some other machine element, such as a chain wheel, which is suitable for substantially slip-free torque transmission.

Referring to FIG. 3b, the driving shaft 10 may conveniently include a separate central part 24 providing the transmission means, with cylindrical bearing surfaces 25 suitable for engagement with radial bearings 28, 29, and generally being of smaller diameter than the transmission means, the gear 22, and two driving-flange bodies 26, 27 which carry the driving flanges at their outer ends and are inserted in an axial opening in the central part 24. The bodies 26, 27 may conveniently be slightly tapered and may be engaged with the middle part by shrinking the latter on to them.

The driving shaft 10 is rotatably mounted in the cylindrical supporting body 11 by means of the radial bearings 28, 29, which are preferably constructed as self-aligning roller or ball bearings. By way of a gear access opening 30 or a diametrically opposed opening 30a in the supporting body 11, suitable transmission means, such as a gear wheel or a chain, can be engaged with the ring gear 22 for the purpose of transmitting the torque, see FIGS. 1 and 4. The supporting body 11 is mounted at its outer ends in the housing 31, 32.

The location of the openings 30 and 30a is of importance to the inventive concept as these openings are located on the body 11 at the locations of minimum bending moment due to forces exerted on the body 11 by the pistons 18. Usually, only one access opening to gear 22 will be formed in body 11, either opening 30 or 30a. However, two openings can be present in body 11, if desired. To locate the gear access opening at the location of minimum bending moment, the opening, or openings, must be symmetrical to the plane in which the intersection of the axes of piston units 12 and 13 and the axis of shaft 10 lies. The bending moment in this plane is nil, and the openings 30 or 30a are bisected by this plane to be symmetrical thereto. Also, the gear access openings are made no larger than necessary to accommodate the gear or chain extending therethrough. Thus, the presence of the gear access opening, or openings, does not significantly weaken the body 11.

FIG. 2 shows an arrangement similar to that shown in FIG. 1, the same reference numerals, but with a prime added, being employed for like structural parts; the same applies to FIG. 5. In contrast to the constructional form according to FIG. 1, in FIG. 2 the axial piston units 12', 13' are adapted to swivel so as to vary their angular position with respect to the driving shaft 10' and the supporting element 11'. As in the embodiment of FIG. 1, the driving shaft 10' is equipped with a toothed rim or ring gear 22' and is rotatably mounted in the supporting element 11' by means of radial bearings 28', 29', which are again constructed as self-aligning roller or ball bearings. The cylindrical supporting element 11' is likewise provided with at least one window-like opening 30', the additional, or alternative opening location 30'a being shown in dotted lines, FIG. 5. The pistons 18' of the axial piston units 12', 13', in the housings 14', 15' are engaged by means of their heads 19' with the driving flanges 20', 21', which are provided at the ends of the driving shaft 10'.

The supporting element 11' is provided at both ends with bearing parts 40, 41 each of which has two eyes 42, 43 or 44, 45 providing bores, FIG. 5, in which there engage pivots such as 48, 49 which are turnably mounted in self-aligning ball or roller bearings 46, 47 and which are in alignment with one another, the common axis of the pivots of each pair lying in the plane defined by the centers of the spherical heads 19' of the pistons 18', FIG. 2.

In the operation of the respective embodiments of FIGS. 1 and 2, the piston 18 or 18' of the axial piston units 12, 13 or 12', 13' are subjected to the pressure of pressure fluid by way of the hydraulic connections 35, 36 or 35', 36' in a manner to be described in detail hereinafter and act by way of their heads 19, 19' on the driving flanges 20, 21 or 20', 21'. The axial piston units are preferably connected to a common pressure line in parallel with one another. In general, three or four pistons 18 or 18' are subjected simultaneously to the pressure applied by the pressure medium, which application takes place over an angular range of a little less than 180°, while in the angular range complementary to the aforesaid range of $2\pi$, the pistons are relieved of pressure and the pressure medium flows off. FIG. 6b shows diagrammatically the simultaneous application of pressure to four pistons, which are actuated in their movement in the housings 12, 13 and 12', 13' by means to be described in detail hereinafter, in each case by way of a kidney-shaped admission port 72 arranged in the control cone, one piston just running into the range of the port 72 and one piston being located a short distance in front of the end of the said port. The force P impressed on the pistons 18 or 18' and acting in the direction of their center lines or axes acts on the driving flanges 20, 21 or 20', 21', with an axial component $A=P \cos \alpha$ and a component $H=P \sin \alpha$ at right angles to the latter, see FIG. 6a. The angle $\alpha$ is the angle of adjustment of the axial piston units with respect to the axis of the driving shaft. The component H in the plane of the driving flange can be resolved into a tangential component $T=H \sin \beta$, which acts to produce the torque, and a normal component $N=H \cos \beta$, see FIG. 6b. Here $\beta$ signifies the angle which the particular piston being considered subtends with respect to the plane of symmetry of the transmission, that is to say, with respect to the plane in which the swiveling of the axial piston units takes place. The resultant P' is $\Sigma P_i$ where $P_i$ are the forces exerted on the driving flange by the pistons to which the pressure medium is applied and it acts at a distance $r_a$ from the center of rotation of the driving shaft, at a common point of application, designated by the reference 55 in FIGS. 6b and 6c. It can be resolved, in the manner indicated diagrammatically in FIG. 6c, into the corresponding components T', A', N'. The tangential component T' acts on the driving flange solely as a rotary force and produces the useful torque. The axial component A' and the normal component N' cause bending moments acting in opposite directions to one another on the driving shaft, due to the fact that the point of application of forces 55 is spaced at the distance $r_a$ from the axis of rotation of the driving shaft 10 or 10' and these bending moments may result in undesirable deformation of the driving shaft.

The transmission arrangement shown in FIGS. 1 and 2 is constructed as a symmetrical double shaft with respect to the driving shaft. According to the invention, precautions described more fully hereinafter are taken which ensure that the position of the point of application of the resultant piston force acting on the second driving flange is exactly opposite the point of application 55. In this way, the resultant axial forces acting on the two driving flanges of a driving shaft are fully equalized. The resultant normal forces N' are taken up by the radial bearings 28, 29 or 28', 29'.

As already mentioned, there are provided on the central portion 24 or 24' of the driving shaft 10 or 10', in the immediate vicinity of the driving flanges 20, 21 or 20', 21', bearing surfaces 25 and 25' respectively which serve to receive the radial bearings 28, 29 or 28', 29', which are constructed as self-aligning roller or ball bearings. The arrangement of the bearings in the immediate vicinity of the drawing flanges insures that the bending-moment acting on the driving shaft, due to the normal forces N' acting on the driving flanges, is small. In the constructional form according to FIG. 1, the position of the bearings 28, 29 may also be so chosen that the oppositely directly moments, due respectively to the normal forces N' and to the axial forces A'' acting on the driving flanges, are of the same magnitude and are thereby equalized, so that the driving shaft is subjected only to bending stresses due to the tangential forces T' which are directed at right angles to the normal forces N' and which provide the torque.

The reaction forces of the pistons 18 or 18' are transmitted to the supporting element 11 or 11' by way of the housings 14, 15 or 14', 15' of the axial piston units 12, 13 or 12', 13' by means of the flanges 16, 17 in the case of the constructional form according to FIG. 1, or by means of the pivots 48, 49 and the eyes 42, 43, 44, 45 in the case of the constructional form according to FIG. 2, and are taken up by the said supporting element. These reaction forces acts at the axes of the axial piston units 12, 13 or 12', 13' and thereby cause the supporting element 11 or 11' to be subjected to tensile and bending stresses. The supporting element 11 or 11' is provided with strong cylindrical walls and the opening 30 or 30' or 30a or 30'a is located at the position where the bending moment is neutralized, as described above. As a result of this arrangement, neither tensile nor bending stresses are transmitted to the housing parts surrounding the cylindrical supporting element and no jamming whatsoever of the bearings can occur.

The reaction forces are transmitted from the pistons 18 or 18' to the control cone 70 by way of the cylinder body 60. The body 60 is formed with cylinder bores 61 and with ducts 62 for the pressure fluid and is guided by a pin 65 which engages in a central bore therein and is engaged with the control cone 70, at 71, by means of a ball-like bearing element 67. The control face 75 is formed by a convex polished usrface on the control cone 70 and a corresponding concave polished surface on the cylinder body 60. Provided in the convex polished surface of the control cone 70 are semi-circular ports which open outwardly of the polished surface and which serve for supplying and carrying away the pressure fluid which applies pressure to the pistons 18 or 18' by way of the duct 62 in the cylinder body 60; these ports are usually referred to as the high-pressure kidney port 72 and the low-pressure kidney port 73. The high-pressure kidney port 72 serves for the application of high pressure, the low-pressure kidney port for carrying the pressure medium away. The control cone 70 is formed with a conical bearing surface 74 by means of which it is mounted in the corresponding housing 14, 15, 14' or 15'.

When pressure is applied to the pistons 18 or 18' by the pressure medium through the high-pressure kidney port 72 and by way of the ducts 62 in the cylinder body 60, the build-up of power is effected only by those pistons which happen to be in the region of the high-pressure kidney port. In this region a reaction force corresponding to the sum of the piston forces acts between the concave polished surface of the cylinder body 60 and the convex polished surface of the control cone 70. In known constructions, this may result in the cylinder body being swung or tilted and in the lubricating film between the interengaging polished surface being squeezed out on one side, with consequent increased wear of the polished surfaces, whereby the life of the arrangement is reduced.

Since the resultant force acting in the plane of the surface of the driving flange, and formed by graphic addition of T' and N', see FIG. 6c, always acts in the swiveling plane of the axial piston units, the driving shaft is displaced by the amount of play in the radial bearings, it being absolutely essential that such play should exist, and this results in further swinging or tilting when plane-parallel polished surfaces are employed. Additional wear of the polished surfaces also occurs because of this.

By the use of interengaging convex and concave polished surfaces, substantially constant width of the lubricating gap between the surfaces is achieved, independent of the load. Limited tilting movements of the cylinder body 60 with respect to the control cone 70 do not result in any relatively tilting movement whatsoever of the polished surfaces since, owing to their convex and concave form, these shift relative to one another in a similar manner to the ball and socket of a ball-and-socket joint, the contact surface remaining constant. Provided in the convex polished surface of the control cone 70 is a groove 76 which encircles the inner zone in which the pressure kidney ports are formed. This groove creates a reservoir of lubricant and acts at the same time as a barrier to check the tendency of the lubricant to flow off radially in all directions away from the high-pressure kidney port. A substantial improvement of the lubricating effect between the interengaging polished surfaces is thereby obtained. Lubrication between the polished surfaces at the control face 75 is facilitated by the fact that due to the application of pressure to the axial piston unit by pressure fluid, the cylinder body 60 is raised, so that a gap is formed through which oil or other fluid leaking from the high-pressure kidney port 72 flows toward the low-pressure kidney port 73 and forms a fluid film.

In order to insure exactly opposite points of application of force on the driving flanges 20, 21 or 20', 21' of the driving shaft 10 or 10' respectively, it is necessary that both axial piston units 12, 13 or 12', 13' shall be arranged so that they are swung through the same angle α with respect to the axis of the driving shaft. In the constructional form according to FIG. 1, this can be achieved by accurate manufacture of the housings 14, 15 and their oblique flanges 16, 17. In adjustable transmissions or drives, such as the constructional form according to FIG. 2, the adjustment of the axial piston units 12', 13' is effected by swiveling of the units about the pivots 48, 49 by means of a synchronizing arrangement, in accordance with one of the constructional forms shown diagrammatically in FIGS. 9 to 13, for example.

The swivel pins 80, 81 of the two axial piston units 12', 13' are pivotally mounted in guide members 82, 83, see FIGS. 7 and 9. The guide members 82, 83 are mounted so as to be axially displaceable on guide rails 84, 85 which are mounted on a central element 86. The central element 86 carries further guide rails 87, 88 and an adjusting rod 91. The guide rails 87, 88 extend through bearing bores in the bosses 89 in the parts 90 of the housing of the transmission and insure the displacement of the central element 86 in a plane determined by the axial piston units 12', 13', which are arranged at the same angle α with respect to the driving shaft. The points marked S indicate the positions of the pivots 48 and 49, respectively, of the axial piston units.

When the central element 86 is displaced by means of the adjusting rod 91, the guide members 82, 83 which are axially displaceable on the guide rails 84, 85 are moved with it and the axial piston units 12', 13', which are articulated to the guide members 82, 83 by means of the swivel pins 80, 81, are moved into a new angular position at the same time. Completely similar angular positions of the two axial piston units 12', 13' are thereby constantly insured over the entire range of adjustment.

The variation of the outside of the axial piston units is proportional not to the angle of adjustment α, but to the sine function of the angle of adjustment. Hence, by means of the adjusting arrangement described above, a variation in output which is proportional to the distance through which the central element 86 is adjusted is achieved. As can readily be seen, in particular from FIG. 9, the distances through which the central element is adjusted are identical with the variation in the sine function of the swiveling angle α of the axial piston units.

Figure 10:
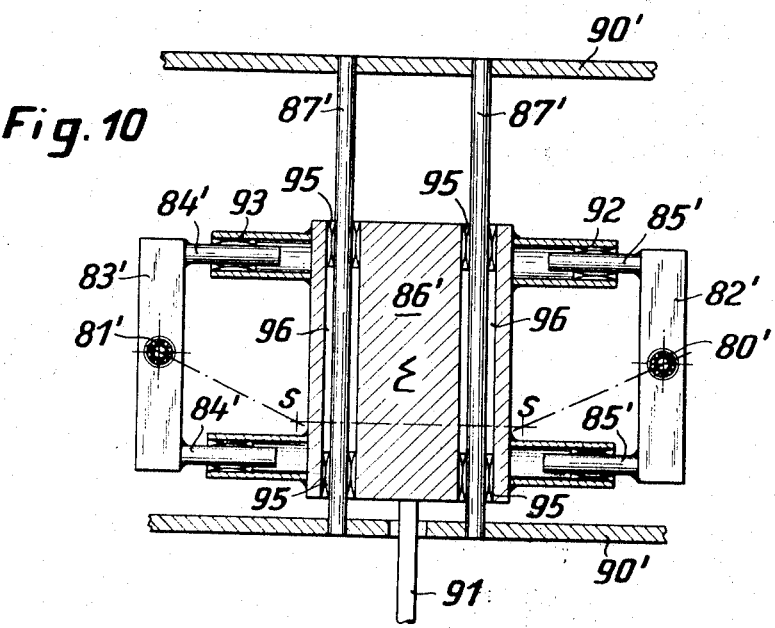
FIG. 10 shows an apparatus similar to that of FIG. 9.

In FIG. 10, guide bushings 92, 93 in which guide rails 84', 85' connected to the guide members 82', 83' engage are mounted on the central element 86'. The central element 86', which is provided with guides 95, is slidably mounted on guide rails 87' which are fixedly connected to the housing parts 90' and extend through bores 96 in the central element 86'. Adjustment of the axial piston units 12', 13' is effected as in the constructional form according to FIG. 9.

In the constructional forms according to FIGS. 11 to 13, simultaneous swiveling of the axial piston units 12', 13' in opposite directions is produced by means of adjusting members 100, 101; 100', 101' or 100", 101" which are adapted to be swung about pivots 48, 49. The adjusting members are provided with segmental toothed racks 102, 103; 102', 103' or 102", 103" which mesh either directly with one another, as in FIG. 11, adjustment being effected by means of an adjusting rod 104 articulated to one adjusting member 101 or with an intermediate adjusting element in the form either of a rack 104' with teeth 105' or of a worm shaft 104" with a worm 105". Instead of the swiveling pins 80, 81 or 80', 81' being mounted rotatably, in the constructional forms according to FIGS. 11 to 13, the swivel pins may be inserted fixedly in the holes 106, 107; 106', 107' or 106" 107". It is also possible to provide slots instead of these holes, or the swiveling pins may be articulated in some other manner. Adjustment is effected by appropriate actuation of the adjusting rod 104, the rack 104' or the worm shaft 104", as the case may be.

As a result of the above-described features, an axial piston drive mechanism or transmission is provided which is distinguished by extraordinarily high efficiency and a surprisingly long life in comparison with known axial transmissions. Owing to their long life, axial piston transmissions according to the invention are especially suitable for use in cooperation with epicyclic gears such as, for example, planetary gearing with automatic load equalization, of the type described in German patent specification No. 3,021,731, in order to form overdrives.

FIG. 14 shows by way of example, one form of overdrive of this kind, consisting of an adjustable hydrostatic transmission C, according to FIG. 2 for example, a nonadjustable hydrostatic transmission D, according to FIG. 1 for example, and a planetary gearing E with automatic load compensation. The adjustable transmission unit C may act by way of gear wheels 110, 111 on the input shaft 112 of the planetary gearing E, the said input shaft being connected to the planet wheel carrier 113, whereby the planet wheels 114, 115 are moved along their paths. The transmission unit D acts on the planet wheels by way of gear wheels 120 and 119 and a ring gear 118 which is connected to the gear wheel 119; the planet wheels are in turn in mesh with the sun gear 116 connected to the driven shaft 117 and, thus, form a take-off connection. Of course, two adjustable hydrostatic transmissions according to FIG. 2 may also be in driving relationship with a gearing of the above indicated kind, instead of one adjustable and one nonadjustable transmission.

As a modification of the arrangement shown, the axial piston transmission C may be interchanged with the axial piston transmission D. Moreover, the driving and driven shafts 112, 117 may be interchanged. In that case either the transmission unit C or the unit D can act on the shaft 117. Still other arrangements are possible for creating power tappings and for regulating a planetary gearing within a desired working range.

In any event, the invention is not limited to the constructional forms illustrated in the drawings and it may be modified in other ways without departing from the scope thereof, as defined by the appended claims.

What is claimed is:

1. A hydraulic transmission assembly comprising, in combination, an elongated, homogeneous, cylindrical, tubular, supporting body having an axis, a central portion, end portions and an inner diameter, bearing means concentrically mounted within said body at said end portions, a drive shaft mounted within said body upon said bearings for rotation about an axis, said drive shaft including a central portion, cylindrical end portions and end faces, gear means defined on said shaft central portion in axial alignment with said body central portion, said bearings engaging said shaft cylindrical end portions, piston retaining means defined upon said shaft end faces, hydraulic piston unit casing support means defined on each of said end portions of said body, a hydraulic piston unit casing mounted upon each of said casing support means, a hydraulic piston unit cylinder block having an axis of rotation mounted within each of said casings, said casings and piston units being equally angularly related to the axis of said body and drive shaft whereby said cylinder block axes intersect at a point radially spaced from said shaft axis, a plurality of axially slidable elongated pistons mounted within each of said cylinder blocks and having ends cooperating with said piston retaining means of the adjacent drive shaft end face, control means including valve means selectively communicating with said pistons, pressurized fluid means communicating with said valve means, said supporting body providing the primary reaction force for the forces transmitted to said drive shaft from said axially slidable pistons, and a drive shaft gear means access opening defined in said cylindrical body central portion in radial spaced alignment with said gear means, said opening being substantially bisected by the plane in which the intersection of said piston unit cylindrical block axes and said drive shaft axis lies whereby said opening is defined at a location of minimum bending stress within said body.

2. In a hydraulic transmission assembly as in claim 1 wherein casing pivot support means are defined in each cylindrical body end portion having axes perpendicularly disposed to said body axis, a casing pivot defined on each of said casings cooperating with said pivot support means permitting angular adjustment of said casings and associated piston unit cylinder block with respect to the axis of said drive shaft, means interconnecting said casings simultaneously equally angularly adjusting said casings and cylinder blocks relative to said drive shaft axis, said gear means access opening being displaced on said body central portion 90° about the circumference thereof with respect to the intersection of said pivot support means axes with the axial projection of said cylindrical body central portion.

3. A hydraulic transmission assembly as in claim 2 wherein said means equally angularly adjusting said casings comprises a central element centrally disposed between said body end portions, rails supporting said element for movement perpendicular to said drive shaft axis, first guide members mounted on said element disposed parallel to said drive shaft axis, second guide members mounted on said first guide members movable thereon parallel to said drive shaft axis, and pivot means connecting each of said casings to one of said second guide means at a point radially spaced from said casing pivots whereby linear movement of said central element simultaneously angularly adjusts said casings relative to said drive shaft axis.

4. A hydraulic transmission assembly as in claim 2 wherein said means equally angularly adjusting said casings comprises similar pivotable levers associated with each of said casings, said levers being pivotally mounted at the axis of the associated casing pivot and pivotally attached to the associated casing at a location radially spaced from the associated casing pivot, a cylindrical segment defined on each of said levers, and meshing means defined on said segments interconnecting said levers for equal simultaneous actuation.

5. A hydraulic transmission assembly as in claim 4 wherein said meshing means includes a gear rack interposed between said segments, and gear teeth defined on said segments engaging said gear rack.

6. A hydraulic transmission as in claim 4 wherein said meshing means includes worm teeth defined on said segments and a rotatable worm gear interposed between and engaging said worm teeth.

References Cited

UNITED STATES PATENTS

| 1,539,616 | 5/1925 | Williams | 91—198 XR |
| 2,968,286 | 1/1961 | Wiggermann | 92—57 XR |
| 3,132,486 | 5/1964 | Jonkers et al. | 60—53 |

EDGAR W. GEOGHEGAN, *Primary Examiner.*

U.S. Cl. X.R.

60—53; 91—200; 193—162